C. H. MELVIN.
WHEELED PLOW.
APPLICATION FILED JUNE 4, 1910.
1,160,743.
Patented Nov. 16, 1915.
2 SHEETS—SHEET 2.
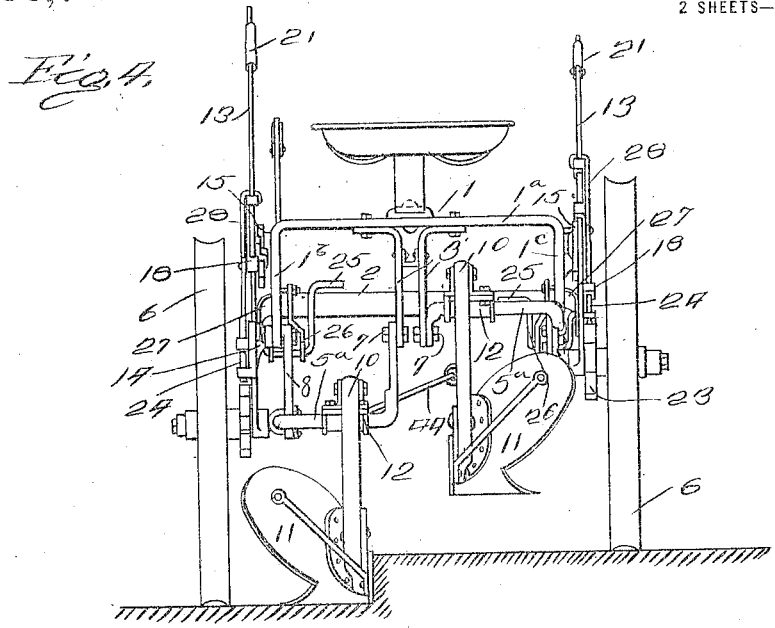
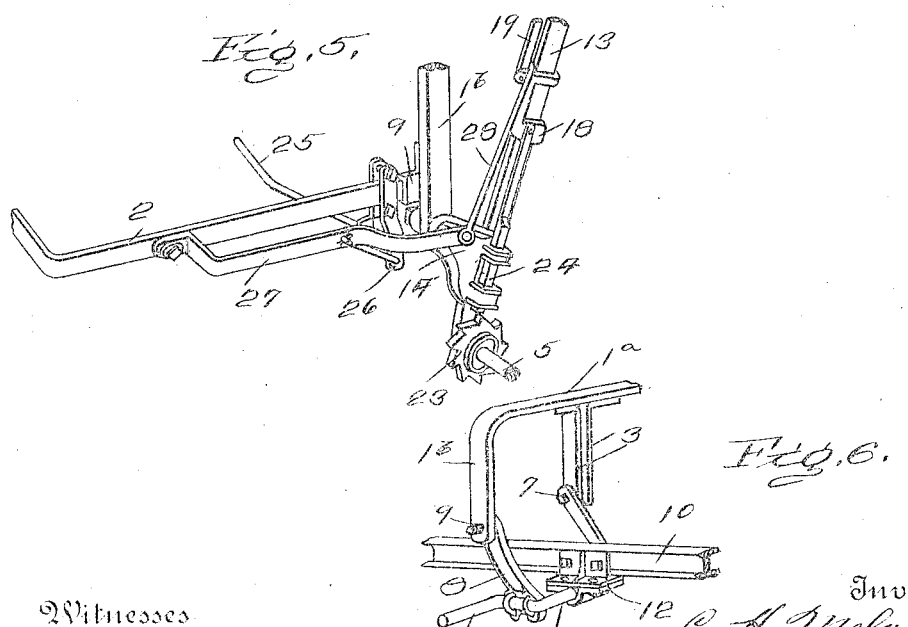

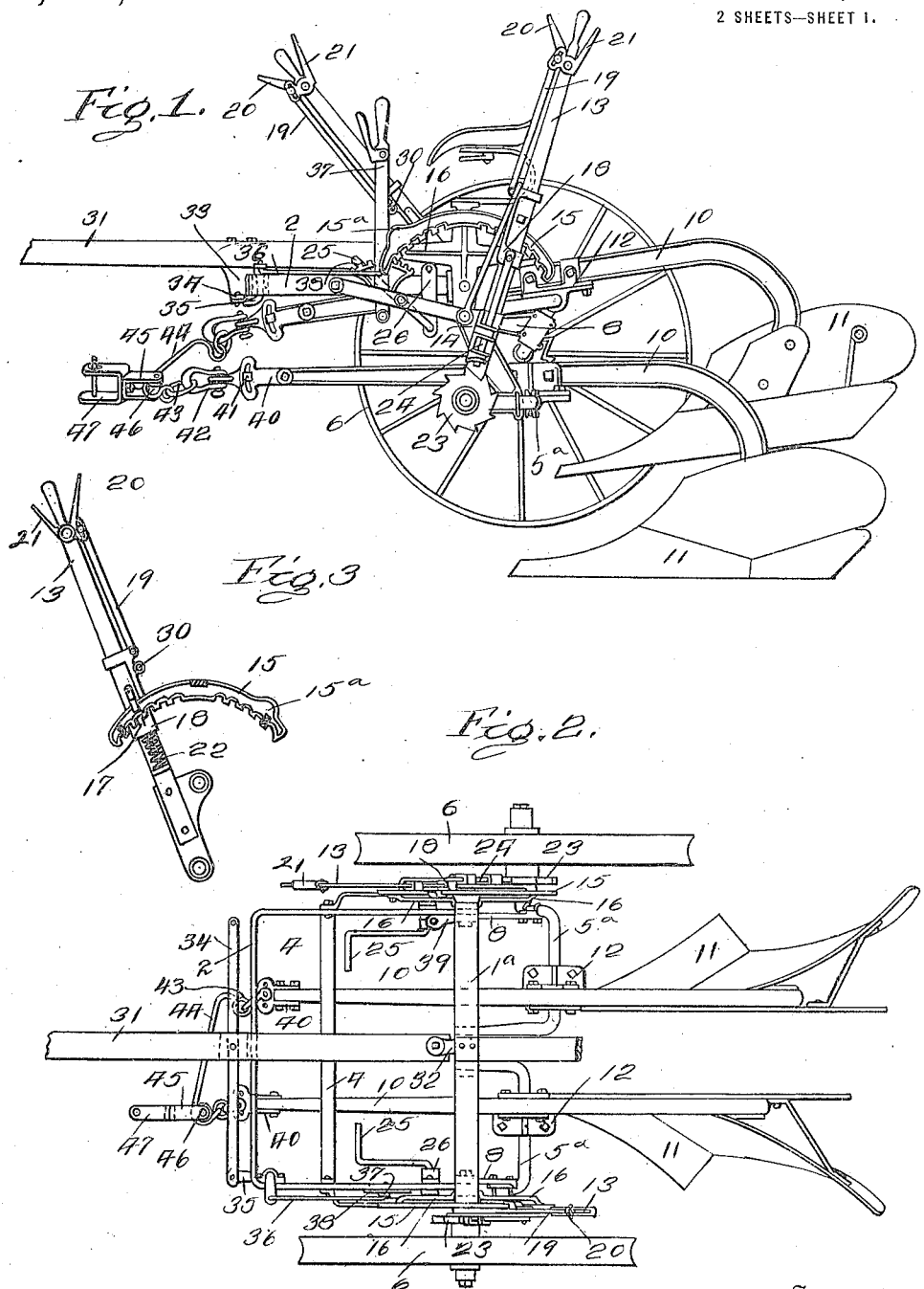

UNITED STATES PATENT OFFICE.

CHARLES H. MELVIN, OF MOLINE, ILLINOIS, ASSIGNOR TO DEERE & COMPANY, A CORPORATION OF ILLINOIS.

WHEELED PLOW.

1,160,743.     Specification of Letters Patent.     Patented Nov. 16, 1915.

Application filed June 4, 1910. Serial No. 565,116.

*To all whom it may concern:*

Be it known that I, CHARLES H. MELVIN, a citizen of the United States, residing at Moline, in the county of Rock Island and State of Illinois, have invented certain new and useful Improvements in Wheeled Plows, of which the following is a specification, reference being had therein to the accompanying drawing.

This invention relates to two-way sulky plows. Plows of this character are designed for plowing back and forth along one side of a piece of land where it is impossible or undesirable to follow the usual method of plowing around the piece. Such plows have a wheel frame and two plow bodies which are usually arranged side by side with their moldboards extending in opposite directions. Means are provided to raise and lower the plows, and in operation one of the plows is lifted to inoperative position while the other is in use.

The principal objects of the present invention are, first, to provide improved means for lifting the plows out of the ground, second, to provide improved means for adjustably connecting the tongue to the wheel frame, and third, to provide improved draft connections.

In the accompanying drawings, Figure 1 is a left side elevation of the plow embodying my improvements, the ground wheel on the near side being omitted to better show some of the features of construction. Fig. 2 is a plan view of the plow. Fig. 3 is a right side elevation of the left lifting lever and the lock rack which coöperates with it. Fig. 4 is a rear elevation of the plow. Figs. 5 and 6 are detail perspective views of parts of the plow lifting mechanism.

Referring in detail to the construction shown, the wheel frame comprises a main upright part 1 preferably in the form of a casting having a middle horizontal part 1$^a$, and at either side thereof depending legs 1$^b$, 1$^c$. To these depending legs are bolted a horizontally disposed forwardly extending U-shaped frame bar 2.

3 is a depending arm or leg preferably in the form of bars which are rigidly secured to the under side of the horizontal part 1$^a$ of the frame at the middle thereof. This depending leg 3 has its lower end in line with the lower ends of the legs 1$^b$, 1$^c$.

4 is a transverse bar which stiffens the forward part of the wheel frame and serves a further function to be referred to later.

Upon the rigid wheel frame thus constituted are mounted two cranked axles each of which carries one of the ground wheels and one of the two plows. Inasmuch as each of the cranked axles and the ground wheel, plow and other moving devices associated therewith are substantially duplicates of the other cranked axle, wheel, plow and other corresponding parts, it will suffice to give a detailed description of one of the said groups of parts, and I shall refer in the following description more especially to the axle, plow and other parts on the left side of the implement. 5 is an axle upon which is mounted the ground wheel 6. The axle 5 has a crank part 5$^a$, the inner arm of which is connected by a pivot bolt 7 to the depending leg 3 of the wheel frame. The outer arm of the crank part is not in the same transverse plane as the inner arm, but a second outer arm part 8, which is rigidly secured to the crank part of the axle is disposed in the same plane with the inner crank arm of said axle and is pivotally connected by a bolt 9 to the lower end of the frame bar 1$^b$, said pivot bolt 9 and the pivot bolt 7 having a common axis.

10 is a plow beam carrying the plow body 11 with out-turned moldboard. The beam 10 carries a bracket 12 which is sleeved upon the crank part 5$^a$ of the axle. By swinging the cranked axle 5, it will be seen that the plow connected to it can be raised and lowered, and to effect such swinging, I provide the following devices: 13 is a hand lever to which is rigidly secured a bracket 14 which extends forwardly and inwardly, and is pivotally connected to the lower end of the frame bar 1$^b$ by means of the pivot bolt 9. The lower end of the lever 13 is sleeved upon the axle 5, and it will be seen, therefore, that by throwing the hand lever forward, the wheel axle can be thrown backward and upward. 15 is a segmental toothed rack carried upon arms 16, 16, which preferably form a part of the casting 1. This rack is disposed adjacent the hand lever 13 and coöperates with a locking bolt, or lug 17 (see Fig. 3) to secure the hand lever in adjusted position. The lug 17 is carried by a sliding sleeve 18 which is connected by means of a link 19 with a finger lever 20 mounted upon the upper end of the hand lever. 21 is a thumb lever, which is also pivoted on the hand lever and has a lost motion connection with the finger lever, as is clearly shown. A spring 22 presses the sleeve 18 upward and tends to maintain the bolt 17 in engagement with the rack 15. By actuating the thumb lever 21, the bolt can be disengaged from the rack and the hand lever freed to move upon its fulcrum.

As it would take considerable force to swing the hand lever to lift the plow from the ground, it has been the common practice to provide means whereby the draft of the team is utilized for this purpose. In the construction shown, I provide such means as follows: 23 is a ratchet rigidly connected to the inner end of the hub of the wheel 6 and disposed adjacent the lower end of the hand lever 13. 24 is a locking bolt slidably mounted on the bracket 14 and connected at its upper end to the sliding sleeve 18. By moving the sleeve 18 downward, the lower end of the bolt 24 can be moved into engagement with the teeth of the ratchet 23, thus locking the ground wheel 6 to the hand lever 13 and through it, to the cranked axle 5. When such locking is effected, the draft of the team transmitted through the ground wheel as the latter advances, is applied to the cranked axle causing the latter to swing backward and upward so as to lift the plow.

Heretofore it has been the practice to throw the bolt 24 into engagement with the ratchet 23 by means of the finger lever 20, or some equivalent hand operated device. One of the objects of my invention is to provide devices for effecting this movement of the bolt 24 which shall be operable by the foot of the driver, thus leaving both of his hands free to guide the team. The importance of this will be understood when it is remembered that the plow is lifted at the side of the field just at the time the driver is starting to turn around for the return trip across the field. The devices which I provide to the end indicated, are as follows: 25 is a foot lever mounted in brackets 26 carried by the frame bar 2 and pivotally connected to a lever 27 which is pivoted at its forward end on the frame bar 2, and has its rear end connected to a link 28 which extends upward and has its upper end formed in the shape of a hook to engage the sliding sleeve 18 on the hand lever. The lever 27 is so formed and mounted that its rear end lies approximately on the axis of the pivotal bolts 7 and 9. In other words, the rear end of the lever 27 is coincident with the axis about which the hand lever swings so that the hand lever can move independently of and without affecting the lever 27.

The foot lever 25 is so disposed that it can easily be reached by the driver when sitting in the seat 29, and when the driver presses downward upon said foot lever, the rear end of the lever 27 is thrown downward carrying with it the sliding sleeve 18 on the hand lever 13, thus causing, first, the disengagement of the locking bolt 17 from the rack 15, and thereafter, the engagement of the bolt 24 with the ratchet 23. The wheel having thus been locked to the cranked axle 5, the latter is thus swung rearward and upward so as to lift the plow from the ground. For the purpose of automatically stopping the lifting movement of the plow, the rack 15 is formed with a cam extension 15$^a$, and the sleeve 18 of the hand lever carries a roller 30 which engages said extension as the hand lever swings forward so that the sleeve 18 is moved upward on the hand lever, thus causing the disengagement of the bolt 24 from the ratchet 23 whereupon the spring 22 is free to continue the movement of the sleeve 18 and cause the bolt 17 to engage a notch in the rack 15, thus locking the plow in its elevated position.

As the axle 5 is swung backward and upward, the first effect upon the plow is to lift the front end of its beam 10 until the latter engages the transverse bar 4 of the wheel frame whereupon the further movement of the swinging axle causes the rear part of the plow to be lifted.

As has been stated, the plow and associated parts on one side of the machine, are substantially duplicated on the other side of the machine, and it will therefore be understood that the plow on the right side of the machine is controlled and actuated by its associated hand and foot lever devices in the manner described in connection with the plow devices on the left side of the machine.

The plow is guided by means of a pole or tongue 31, which is pivotally connected at its rear end to a bracket 32, bolted to the depending leg 3 of the wheel frame. 33 is a bracket bolted to the lower side of the tongue and having a sliding engagement with the transverse part of the frame bar 2.

34 is a link pivoted at its middle part to the bracket 33, and at its left end to a bell-crank lever 35 mounted at the forward left corner of the frame bar 2. This bell-crank lever is connected by means of a link 36 to a hand lever 37 mounted on a bracket 38 on the wheel frame, said bracket being formed with a segmental locking rack 38$^a$, which coöperates with an ordinary locking bolt on the hand lever to secure the latter in adjusted position. By throwing the hand lever 37 backward and forward, the tongue 31 can be swung laterally, thus causing the plow to take more or less land, a feature which is desirable especially when working on hill sides.

It is sometimes desirable to use three horses on an implement of this kind, and to make this easily accomplished, I provide a pivot bracket 39 which is bolted to the frame bar 1°, and to which the rear end of the tongue may be pivoted rather than to the bracket 32. When this change is made, the bracket 33 is pivotally connected to the extreme right end of the link 34. The tongue can then be angled by means of the hand lever 37 as before.

The draft devices, by means of which the draft animals are hitched to the plows, are peculiarly constructed as follows: On the forward end of each plow beam is pivoted a bracket 40 which can be adjusted up and down to a limited extent, and secured in adjusted position by means of the clamping bolt 41. To each of these brackets is secured an ordinary clevis 42, and to these two clevises 42 are loosely connected, as by links 43, the two ends of a rod 44. The main part of the rod 44 is straight, but its ends are curved backward, as is clearly shown in Figs. 1 and 2. 45 is a block carrying a pulley 46 adapted to run upon the rod 44, and 47 is a draft clevis having a swivel connection with the pulley block 45.

It will be noted on reference to Fig. 1 that the front end of the beam of the plow, which is lifted to inoperative position, is higher than the front end of the beam of the other plow which is lowered to working position. Because of this the clevis 47 and pulley 46, carrying as they do the weight of the doubletrees, tend to slide to that end of the rod 44 which is connected to the lower plow and thus the draft is applied quite directly to the plow which is in operative position, and furthermore, the line of draft is shifted automatically from one plow to the other when one is lifted and the other lowered.

The operation of my improved plow will now be readily understood. On arriving at the point in the field where the plow is to be started, the driver grasps the thumb lever 21 of one or the other of the hand levers 13 and swings it rearward to lower the plow connected therewith, one or the other of the plows being lowered according as the earth is to be thrown to the right or the left. When the plow has reached the desired depth, the thumb latch 21 is released and the hand lever locked in adjusted position. As the plow is lowered the draft connections 45, 46, 47, slide into line with the beam of the lower plow, and the draft of the team, as the plow takes into the ground, is applied directly to the beam of the plow. If the plow body when thus lowered is level, no other adjustment than that of the hand lever in lowering the plow is necessary, but if the bottom when thus lowered is not level, the hand lever 13 on the other side of the plow can be adjusted more or less to swing the ground wheel on that side of the plow up or down relative to the frame, and thus effect the leveling. On reaching the turning point, the driver presses upon the foot lever 25 of the working plow thus disengaging the hand lever 13, and at the same time, locking the ground wheel to its axle and causing the axle to swing rearward and upward carrying with it the plow. As the plow rises to its full elevation, the lifting devices are automatically disengaged and the locking devices automatically applied in the manner previously described. Then, the driver, having turned through 180°, lowers the other plow, and having leveled it, if necessary, proceeds as before.

If the plowing is being done on the side hill, the tongue 31 can be angled in the manner previously described so as to hold the plow properly to its work.

What I claim is:—

1. In a two wheel sulky plow, the combination of a main frame, a swinging cranked wheel axle, a ground wheel thereon, a plow having its beam connected with the main frame solely through a pivotal connection with the swinging axle, means for locking said ground wheel to the said axle, and foot actuated devices for controlling said locking means, said foot actuated devices being connected to the locking devices at a point substantially on the axis around which the cranked wheel axle swings.

2. In a two wheel sulky plow, the combination of a main frame, a swinging cranked wheel axle, a ground wheel thereon, a plow having its beam pivotally connected to said axle, a hand lever connected to said axle to swing therewith, manually controlled devices mounted on said lever for locking the ground wheel to the axle, and foot actuated devices on the main frame connected with and adapted to actuate the said locking devices on the hand lever, said foot actuated devices being connected to the locking devices on the hand lever at a point substantially on the axis around which the cranked wheel axle swings.

3. In a two wheel sulky plow, the combination of a main frame, a swinging cranked wheel axle, a ground wheel thereon, a plow having its beam pivotally connected to said axle, a hand lever connected to said axle to swing therewith, manually controlled devices mounted on said lever for locking the ground wheel to the axle, means for adjustably locking the hand lever to the main frame mounted on said hand lever and connected to said locking devices, and foot actuated devices on the main frame connected with and adapted to actuate the said wheel locking devices and lever locking means on the hand lever, said foot actuated devices being connected to the wheel locking devices and lever locking means at a point substantially on the axis around which the cranked wheel axle swings.

4. In a two wheel sulky plow, the combination of a main frame, a swinging cranked wheel axle, a ground wheel thereon, a plow having its beam pivotally connected to said axle, a hand lever connected to said axle to swing therewith, manually controlled devices mounted on said lever for locking the ground wheel to the axle, and foot actuated devices on the main frame connected with and adapted to actuate the said locking devices on the hand lever, said foot actuated devices comprising a lever pivoted on the main frame and a link connected to the manually controlled devices on the hand lever and connected to the lever on the main frame at a point normally on the axis about which the axle and hand lever swing.

5. In a two way sulky plow, the combination of a main frame, two independent swinging cranked axles, a ground wheel mounted on each of said axles, two plows arranged side by side each with its mold board turned outward and each pivotally connected to one of the axles, means for locking each ground wheel to its axle, and foot actuated devices for controlling each locking means independently of the other, the said foot actuated devices being fixed against movement with the axles.

6. In a two way sulky plow, the combination of a main frame, two independently swinging cranked axles, a ground wheel mounted on each of said axles, two plows arranged side by side each with its mold board turned outward and each pivotally connected to one of the axles, a hand lever connected with each axle to swing therewith, manually controlled devices mounted on each lever for locking the adjacent ground wheel to its axle, and foot actuated devices on the main frame connected with and adapted to independently actuate the locking devices on the hand levers, the said foot actuated devices being fixed against movement with the axles.

7. In a two way sulky plow, the combination of a main frame, two independently swinging cranked axles, a ground wheel mounted on each of said axles, two plows arranged side by side each with its mold board turned outward and each pivotally connected to one of the axles, a hand lever connected with each axle to swing therewith, manually controlled devices mounted on each lever for locking the adjacent ground wheel to its axle, means on each hand lever for adjustably locking it to the main frame, said locking means being connected to the said locking devices on the same lever, and foot actuated devices on the main frame connected with and adapted to actuate the locking devices and locking means on each hand lever independently of those on the other hand lever, the said foot actuated devices being fixed against movement with the axles.

8. In a two way sulky plow, the combination of a main frame, two independently swinging cranked axles, a ground wheel mounted on each of said axles, two plows arranged side by side each with its mold board turned outward and each pivotally connected to one of the axles, a hand lever connected with each axle to swing therewith, manually controlled devices mounted on each lever for locking the adjacent ground wheel to its axle, and foot actuated devices on the main frame connected with and adapted to independently actuate the locking devices on the hand levers, each of said foot actuated devices comprising a lever pivoted on the main frame and a link connected to the manually controlled devices on one of the hand levers and connected to the lever on the main frame at a point normally on the axis about which said hand lever and its swinging axle swing.

9. In a sulky plow, the combination with a lifting lever and connections for raising and lowering the plow, a locking device and means coöperating therewith for connecting the lifting lever with the sulky wheel for raising the plow, a hand lever mounted on the lifting lever for operating the locking device, a foot lever mounted on the sulky frame, an arm pivoted on the sulky frame in advance of the foot lever and connected to the foot lever, and connections between said arm and said locking device for operating the latter by the movement of the foot lever, substantially as set forth.

10. In a sulky plow, the combination with a lifting lever and connections for raising and lowering the plow, a locking device and means coöperating therewith for connecting the lifting lever with the sulky wheel for raising the plow, a hand lever mounted on the lifting lever for operating the locking device, a foot lever pivoted on the sulky frame to swing forwardly and downwardly, an arm pivoted on the sulky frame in advance of the foot lever and extending rearwardly from its pivot and connected with the foot lever, and connections between the rear end of said arm and the locking device for operating the latter, substantially as set forth.

11. In a sulky plow, the combination with a lifting lever and connections for raising and lowering the plow, a locking device and means coöperating therewith for connecting the lifting lever with the sulky wheel for raising the plow, a hand lever, and means connecting said hand lever with said locking device which are mounted on said lifting lever and movable lengthwise thereof, said hand lever being pivoted to said lifting lever and having an arm arranged in advance of said lifting lever and adapted to be pulled forwardly away from said lever to operate said locking device, and an arm arranged in the rear of said lifting lever and adapted to be pulled outwardly away from said lifting lever to operate said locking device, substantially as set forth.

In testimony whereof I affix my signature, in presence of two witnesses.

CHARLES H. MELVIN.

Witnesses:
EUGENE L. TAYLOR,
ROY E. ANDERSON.

Copies of this patent may be obtained for five cents each, by addressing the "Commissioner of Patents, Washington, D. C."